United States Patent
Haley et al.

[11] Patent Number: 5,830,049
[45] Date of Patent: Nov. 3, 1998

[54] METHOD AND APPARATUS FOR ASSISTING IN CRAB PICKING

[76] Inventors: John G. Haley, 3638 Green Point Rd., East New Market, Md. 21631; William L. Corbin, 107 Trailing Ivy La., Severna Park, Md. 21146

[21] Appl. No.: 789,133

[22] Filed: Jan. 28, 1997

[51] Int. Cl.⁶ .................................................. A22C 29/02
[52] U.S. Cl. ................................ 452/6; 452/17; 30/120.1
[58] Field of Search .............................. 452/6, 1, 13, 17; 30/120.1, 107, 309, 356

[56] References Cited

U.S. PATENT DOCUMENTS

| | | | |
|---|---|---|---|
| 282,677 | 8/1883 | Small et al. ............................... | 30/356 |
| D. 330,827 | 11/1992 | Jarzynka ................................... | D7/693 |
| 332,657 | 12/1885 | Humphrey ................................. | 452/6 |
| 2,251,842 | 8/1941 | Hill ......................................... | 30/149 |
| 2,335,806 | 11/1943 | Sjostrom . | |
| 2,497,342 | 2/1950 | Brustolon et al. ........................ | 30/356 |
| 2,513,663 | 7/1950 | McDaniel ................................. | 30/356 |
| 2,707,325 | 5/1955 | Cripps ..................................... | 30/1 |
| 2,876,487 | 3/1959 | Pasquale . | |
| 3,486,188 | 12/1969 | Senick . | |
| 3,696,849 | 10/1972 | Davis ....................................... | 146/146 R |
| 3,735,445 | 5/1973 | Jurcak . | |
| 3,991,466 | 11/1976 | Smith ....................................... | 452/17 |
| 4,159,839 | 7/1979 | Sigler ...................................... | 294/1 R |
| 4,293,981 | 10/1981 | Smith . | |
| 4,479,284 | 10/1984 | Tolley et al. . | |
| 4,569,103 | 2/1986 | Taurinskas . | |
| 4,574,479 | 3/1986 | Gramann ................................. | 30/142 |
| 4,610,052 | 9/1986 | Lubcke . | |
| 4,970,786 | 11/1990 | Harper .................................... | 30/356 |

*Primary Examiner*—Willis Little
*Attorney, Agent, or Firm*—Foley & Lardner

[57] ABSTRACT

A method and apparatus for cracking a crab or other similar shellfish. In this regard, the present invention provides a method for simultaneously removing the legs, pincers and back shell of the crab, comprising placing the shellfish on a surface with the back shell on the surface. Then, a tool having a curved surface is placed along one side of the shellfish adjacent the juncture of the crab body and the crab legs and pincers and over the edge of the back shell. A strong force is then exerted on the tool sufficient to sever the legs and pincers from the body and generally loosen the back shell. The above steps are then repeated on the other side of the crab so as to sever the remaining legs and pincers and further loosen the back shell.

4 Claims, 2 Drawing Sheets

METHOD AND APPARATUS FOR ASSISTING IN CRAB PICKING

BACKGROUND OF THE INVENTION

1. Field of the Invention

The present invention relates generally to tools and methods useful for preparing crabs for consumption, and in particular to an apparatus and method for simultaneously removing the back shell, pincers, and legs of the crab.

2. Description of Related Art

Shellfish, primarily crab, are an extremely popular food item. Many people enjoy eating steamed crab which are prepared and served with the shell intact. Before the meat can be consumed, a person must first remove the hard back shell and remove the meat from the inside. This process has proven difficult in the past. For instance, in the case of a crab, there is consumable meat contained in the body, each section of the legs, and in each of its pinchers. Each of these portions of edible meat is encased in a separate shell which must be separately cracked to remove the meat therefrom. With crab meat being such a delicacy, most people want to ensure that every piece of meat is eaten. Thus, the removal of meat from a single crab can take quite a substantial amount of time. In addition, people can be cut or injured due to the sharp edges which form when the shell breaks irregularly.

Commonly, the back shell is removed with a knife-like implement which can be dangerous and/or difficult.

As an aid to cracking open these sort of shellfish the prior art has also proposed manual knife assemblies which include a base and a pivotal blade. For example, U.S. Pat. No. 3,486,188 proposes a crab shelling device wherein a crab body is cleaned of its outer legs and then placed on a base. A bar is lowered over the crab body and pressed thereon to crack the outer shell of the crab. However, this type of device is relatively expensive and cumbersome to place on a table during dinner, particularly if several people are all eating shellfish, each person having his or her own cutting device. Furthermore, the compressive action of devices such as the device of U.S. Pat. No. 3,486,188 frequently causes the internal juices of the shellfish to splatter in an undesirable fashion.

Therefore, a need exists for a simple apparatus and method for cracking shellfish which permits the shell to be broken so that the edible portions are easily removable therefrom.

SUMMARY OF THE INVENTION

The present invention is directed toward a method for shelling a crab. The present invention is further directed toward apparatus which is useful in conjunction with the present method. In this regard, the present invention provides a method for simultaneously removing the legs, pincers and back shell of a crab. This is accomplished by, first, placing the crab on a surface with the back shell thereof on the surface. A tool having a curved surface is then placed along one side of the crab adjacent the juncture of the body and the legs and pincers and over the edge of the back shell. A strong force is then exerted on the tool sufficient to sever the legs and pincers from the body and generally loosen the back shell. The above steps are then repeated on the other side of the crab so as to sever the remaining legs and pincers and further loosen the back shell.

In accordance with the present invention there is provided a tool suitable for use as an aid for simultaneously removing the legs, pincers, and back shell comprising a handle and a curved blade. The curved blade has two edges, one edge being tapered so as to form a sharp edge, and the other edge being substantially dull or blunt. In use, the sharp edge is placed adjacent the body so that the curved portion is substantially aligned with the curve of the body of the crab. The dull edge of the tool is then struck with a mallet or other similar object, thereby causing a crack in the shell along the curved surface of the sharp edge of the tool.

It is therefore an object of the present invention to provide a method for cracking the shell of a crab which is easily performed by a child or an adult.

It is a further object to provide a method which permits the shell of a crab to be cracked in a manner which permits the maximum quantity of edible meat of the fish to be extracted.

It is a further object to provide a method for cracking the shell of a crab which reduces the time required to extract the edible meat portion therefrom.

It is a further object to provide an apparatus useful in conjunction with the above method which can be manufactured simply and inexpensively.

It is yet a further object to provide a method and apparatus which may be used to simultaneously remove the legs, pinchers and back shell of a crab or other shellfish.

It is still a further object to provide an apparatus which may be used to create a curved crack along the outer perimeter of the shell.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

DETAILED DESCRIPTION OF THE PREFERRED EMBODIMENTS

Figure 1:
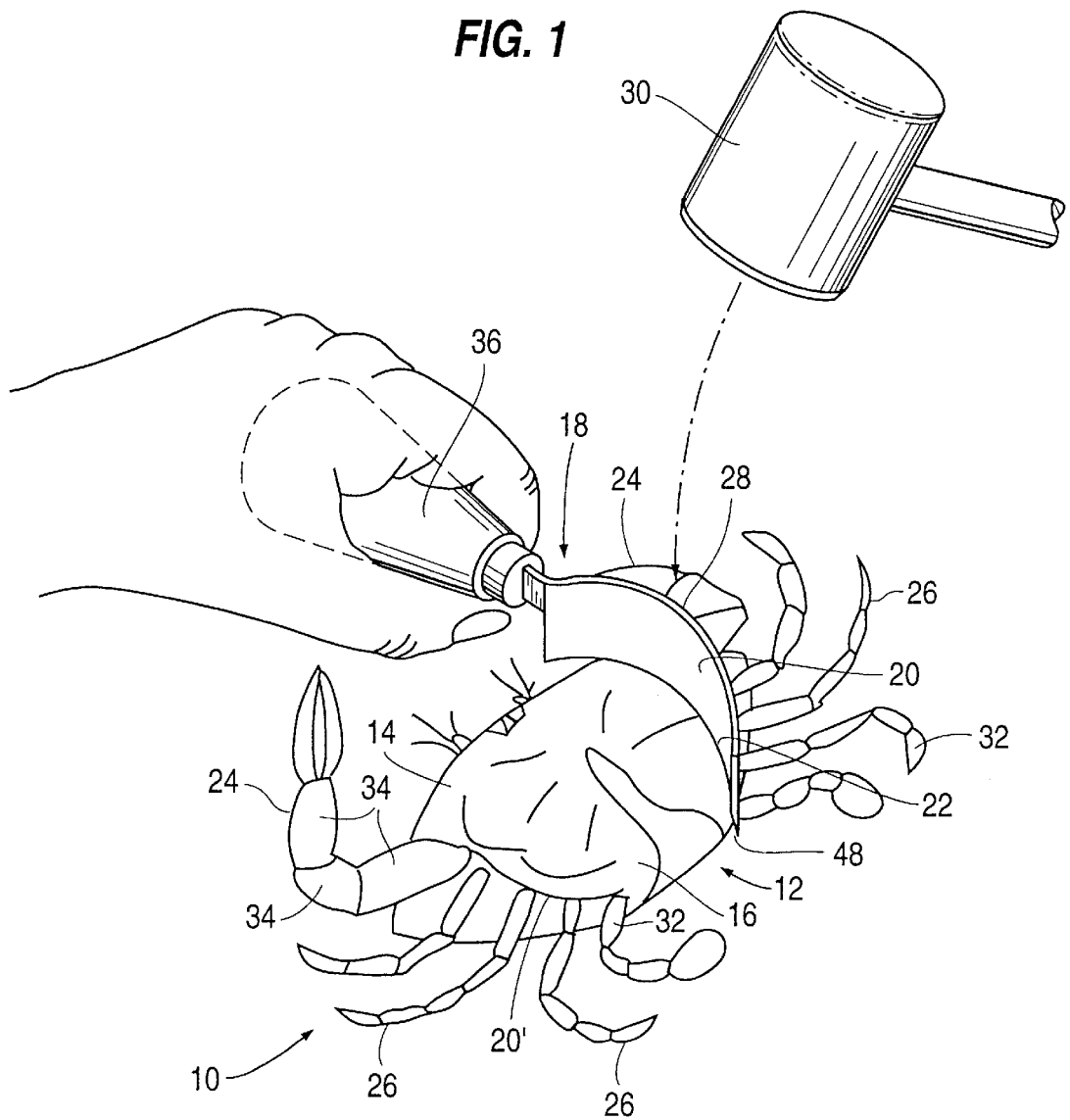
FIG. 1 is a perspective view showing a curved tool being used according to the method of the present invention.
Figure 2:
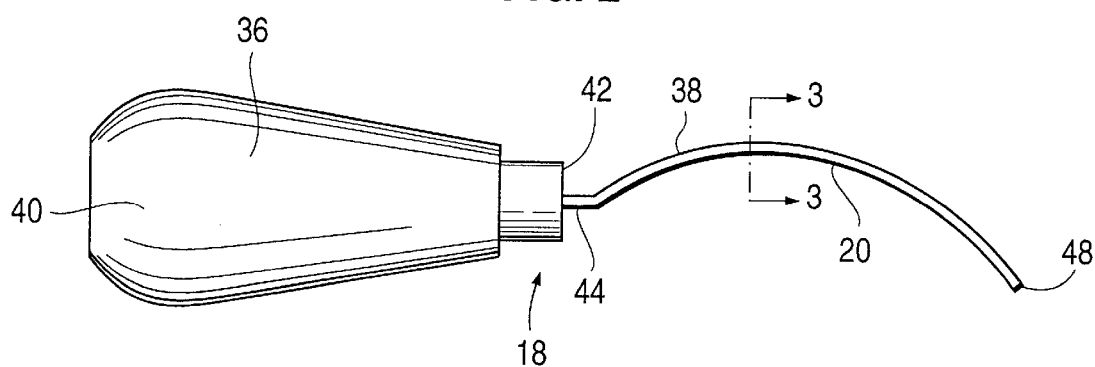
FIG. 2 is a top view of the curved tool of the present invention.

The present method may be performed on a crab or other shellfish having a hard outer surface which must be removed prior to removal of edible meat therefrom. Particularly, the method is useful in conjunction the removal of crab back shells. However, it is contemplated that the present method and apparatus are useful with other types of shellfish which require the removal of an outer covering or shell.

A crab or other similar shellfish, generally designated as 10, is placed on a surface (not shown). The shellfish has a body portion 12, which body portion 12 is completely covered by a body shell 14. The body shell 14 includes a curved upper back shell (not shown) and a generally flat underneath portion 16. The back shell portion of the outer shell 14 is placed against the surface. A tool 18 having a curved surface 20 is then placed along one side of the crab 10 against the outer edge of the back shell, adjacent the juncture 22 of the shell 14 and the legs 24 and pincers 26. The curved surface 20 of the tool 18 is most preferably adapted to conform to the natural curvature of the underneath portion 16 of the crab shell 14 at the juncture point 22.

A strong force is then exerted on an upper edge 28 of the tool 18 in the direction of the arrow shown in FIG. 1, sufficient to sever the legs 24 and pincers 26 from the body portion 12 and generally loosen the back shell. The force is preferably exerted by a wooden hammer or mallet type instrument 30 of the type. conventionally used with deshelling crabs and other shellfish. However, any type of instrument which can be used to impart force on the upper edge 28 of the tool 18 could be used.

The crab 10 is then rotated approximately 180° so that the tool is now positioned along the opposite side of the crab 10 adjacent the juncture 22' of the body shell 14 and the legs 24 and pincers 26. The above steps are then repeated on the other side of the crab so as to sever the remaining legs 24 and pincers 26 and further loosen the back shell.

After the procedure has been performed on both sides of the crab, all legs 24 and pincers 26 are most likely completely severed, and the back shell is loosened or completely severed from the body portion 12 of the crab 10. The back shell is now easily removed from the crab 10 and the body shell can be further cracked in order to obtain the meat. To aid in removing the meat from the pinchers 26 and legs 24, the tool 18 may be placed along the outer shell of these appendages 24,26 and a similar force may be exerted by the hammer 30 or other instrument. Each leg 24 and pincer 26 includes multiple shell encased cavities 32,34 each of which has edible meat inside. By using the tool 18 and above method on the pincers 26 and legs 24, the multiple cavities 32,34 may be deshelled with a single action.

Figure 3:
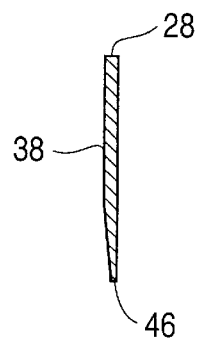
FIG. 3 is a cutaway view taken along line 3—3 of FIG. 2.

Reference is now made to FIGS. 1 and 3 showing the tool 18 suitable for use as an aid for simultaneously removing the legs 24, pincers 26, and back shell of a crab 10 comprising a handle 36 and a curved blade 38. The curved blade 38 has an inwardly curved inner surface 20 and the blade 38 generally forms a portion of a cylinder. In a preferred embodiment, the curvature of the blade 38 is approximately ¼ of a full circle. Although the blade 38 may be of any rigid construction, it is preferably formed of stainless steel or other suitable metal.

The handle 36 is of an ergonomically suitable shape, preferably a teardrop shape wherein the outer portion 40 of the handle 36 is bulbular, tapering to a smaller diameter blade receiving end 42. The handle 36 is preferably formed of wood, plastic, or any other heavy duty material which is long-lasting and easy to clean. A terminal end 44 of the curved blade 38 is mounted within an aperture (not shown) formed in the blade receiving end 42 of the handle 36. The curved blade 38 has two edges, one edge being tapered so as to form a sharp edge 46, and the other edge 28 which is generally the upper edge, being substantially dull or blunt.

As discussed above, in use, the sharp edge 46 is placed adjacent the shellfish body 12 so that the curved portion 20 of the blade 38 is substantially aligned with the curved junction 22,22' between the underneath portion of the shell 16 and the legs 24 and pincers 26. The dull edge 28 of the tool is then struck with the hammer 30 or other similar object, thereby loosening the back shell and severing the legs 24 and pincers 26 from the body 12. The tool 18 may also be used to open the cavity portions 32,34 of the legs 24 and pincers 26 as described above.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A method of simultaneously removing the legs, pincers and back shell of a shellfish, comprising:

a) placing the shellfish on a surface with the back shell thereof on the surface;

b) placing a tool, having a curved surface along one side of the crab adjacent the juncture of the shellfish body and the shellfish legs and pincers and over the edge of the back shell;

c) exerting a force on the tool sufficient to sever the legs and pincers from the body and generally loosen the back shell; and d) repeating steps b) and c) on the other side of the shellfish and severing the remaining shellfish legs and pincers and further loosening the back shell.

2. A method according to claim 1, wherein the shellfish is a crab.

3. A method according to claim 1, which further comprises:

e) placing the tool along the outer shell portion of one of the legs or pincers which has been severed;

f) exerting a force on the tool sufficient to crack the outer shell and expose the meat inside the outer shell;

g) repeating steps e) and f) on the remaining shellfish legs and pincers.

4. A method according to claim 3, which further comprises using the tool to remove edible meat from the body, legs, or pincers of the shellfish.

* * * * *